US005347427A

United States Patent [19]

Kinoshita

[11] Patent Number: 5,347,427
[45] Date of Patent: Sep. 13, 1994

[54] CABINET ASSEMBLY

[75] Inventor: Hirotaka Kinoshita, Nagasaki, Japan

[73] Assignee: Mitsubishi Denki Kabushiki Kaisha, Tokyo, Japan

[21] Appl. No.: 24,439

[22] Filed: Mar. 1, 1993

[30] Foreign Application Priority Data

Apr. 20, 1992 [JP] Japan .................. 4-125442
Dec. 9, 1992 [JP] Japan .................. 4-329274

[51] Int. Cl.$^5$ .............................. H05K 5/00
[52] U.S. Cl. .................. 361/752; 200/332.1; 361/631
[58] Field of Search ............ 200/314, 332, 332.1, 200/341, 343; 361/331–332.1, 346, 350, 380

[56] References Cited

U.S. PATENT DOCUMENTS

| 4,225,766 | 9/1980 | Pfeifer et al. | 200/314 |
| 4,434,340 | 2/1984 | Kondo | 200/332 |
| 4,613,736 | 9/1986 | Shichijo et al. | 200/343 |
| 4,877,925 | 10/1989 | Kobayashi | 200/343 |
| 4,967,467 | 11/1990 | Udagawa | 200/343 |
| 5,003,133 | 3/1991 | Kobayashi et al. | 200/343 |
| 5,188,220 | 2/1993 | Schmitt-Walter | 200/343 |

FOREIGN PATENT DOCUMENTS

| 60-196078 | 10/1985 | Japan . | |
| 63-176226 | 11/1988 | Japan . | |
| 0227317 | 9/1989 | Japan | 200/341 |

Primary Examiner—Gregory D. Thompson
Attorney, Agent, or Firm—Burns, Doane, Swecker & Mathis

[57] ABSTRACT

A cabinet assembly comprises a cabinet, a main wiring board provided with a control circuit and disposed within the cabinet, switches for controlling the control circuit, and keys for operating the switches, capable of being pushed from outside the cabinet. To eliminate restrictions placed by the keys and a light emitting diode for indicating actions of the control circuit on the design of the cabinet, to simplify the construction of the cabinet assembly and to facilitate cabinet assembly assembling work, the switches and the light emitting element are mounted on the main wiring board, the keys are formed and disposed so that the key top of each key form a portion of the external shape of the cabinet, each key is provided integrally with an actuating rod for operating the corresponding switch, and the light emitted by the light emitting element is transmitted by a light transmitting member to a portion of the wall of the cabinet or to the key top of the pushed key.

2 Claims, 4 Drawing Sheets

CABINET ASSEMBLY

BACKGROUND OF THE INVENTION

1. Field of the Invention

The present invention relates to a cabinet assembly capable of enabling selecting modes of operation of a control circuit formed on a main wiring board disposed therein and adjusting the control circuit by means of external switches.

2. Description of the Prior Art

Referring to FIG. 1 showing a prior art cabinet assembly, the cabinet assembly comprises a cabinet 1, a cathode-ray tube (abbreviated to "CRT") 2 for displaying pictures, a main wiring board 3 provided with a control circuit and disposed in the bottom portion of the cabinet 1, and a wiring board 4 (FIG. 2) disposed in front of the main wiring board 3 within the cabinet 1. As shown in FIG. 2, the wiring board 4 is provided with switches 5 operated by keys 6 for switching and adjusting the control circuit, and a light emitting diode (abbreviated to "LED") 7 for confirming the results of switching operations and adjusting operations.

A lead connector 8 has one end fixed to the wiring board 4 at a position near the switches 5 and the other end connected to the main wiring board 3. The keys 6 are formed integrally with an elastic plate 6A having holes A. The elastic plate 6a is fixed to the inner surface of the cabinet 1 by means of the holes A so that the keys 6 are exposed through an opening 11 formed in the front wall of the cabinet 1.

When adjusting various modes of displaying pictures on the screen of the CRT 2, the key 6 is operated. Then, the elastic plate 6A is moved in the direction of the arrow P and thereby the adjusting switch 5 is operated. Then, a signal is transmitted through the operated adjusting switch 5 and the lead connector 8 to the main wiring board 3 having the control circuit to operate the control circuit, and then a confirmation signal is transmitted through the lead connector 8 to the wiring board 4 to turn on the LED 7.

This prior art cabinet assembly needs the wiring board 4 provided with the switching and adjusting switches 5 additionally, and the wiring board 4 requires additional assembling work for attaching the same to the front wall of the cabinet 1 so that the keys 6 are exposed through the opening 11, which makes the construction of the cabinet assembly complex, increases assembling work and places restrictions on the design of the cabinet 1.

SUMMARY OF THE INVENTION

In view of the foregoing, it is an object of the present invention to provide a cabinet assembly having a main wiring board serving also as a wiring board for supporting switches, having a cabinet integrally incorporating keys for operating the switches to eliminate restrictions on the design of the cabinet caused by the keys and a LED for indicating the action of the control circuit, having a simple construction and facilitating assembling work.

It is another object of the present invention to provide a cabinet assembly having a cabinet, and provided with a LED for indicating the action of the control circuit, mounted on a main wiring board disposed within the cabinet and light transmitting means for transmitting the light emitted by the LED to enable the recognition of the light emitted by the LED from outside the cabinet.

According to a first aspect of the present invention, to achieve the object of the invention, there is provided a cabinet assembly comprising; a cabinet: a main wiring board provided with a control circuit; switches for switching and adjusting the control circuit, mounted on the main wiring board; a light emitting element for indicating actions of the control circuit, mounted on the main wiring board; and keys forming portions of the external shape of the cabinet and capable of being pushed from outside the cabinet; wherein each key is provided integrally with an actuating rod to operate the corresponding switch when the keys is pushed; and the light emitted by the light emitting element is transmitted by a light transmitting member to the key top of the key to illuminate the key top.

According to a second aspect of the present invention, there is provided a cabinet assembly comprising: a cabinet; a main wiring board provided with a control circuit; switches for switching and adjusting the control circuit, mounted on the main wiring board; a light emitting element for indicating the actions of the control circuit, mounted on the main wiring board; and keys capable of being pushed from outside the cabinet and each having a key top forming a portion of the external shape of the cabinet; wherein each key is provided integrally with an actuating rod to operate the corresponding switch when the key is pushed, and the light emitted by the light emitting element is transmitted by a light transmitting member to a portion of the cabinet to illuminate the portion of the cabinet.

As stated above, in the cabinet assembly in the first aspect of the present invention, each actuating rod transmits the movement of the corresponding key to the corresponding switch mounted on the main wiring board disposed within the cabinet when the key is pushed, and then the light transmitting member transmits the light emitted by the light emitting element to the key so that the key is illuminated.

Furthermore, in the cabinet assembly in the second aspect of the present invention, each actuating rod transmits the movement of the corresponding key to the corresponding switch mounted on the main wiring board disposed within the cabinet when the key is pushed, and then the light transmitting member transmits the light emitted by the light emitting element to a portion of the cabinet so that the portion is illuminated.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
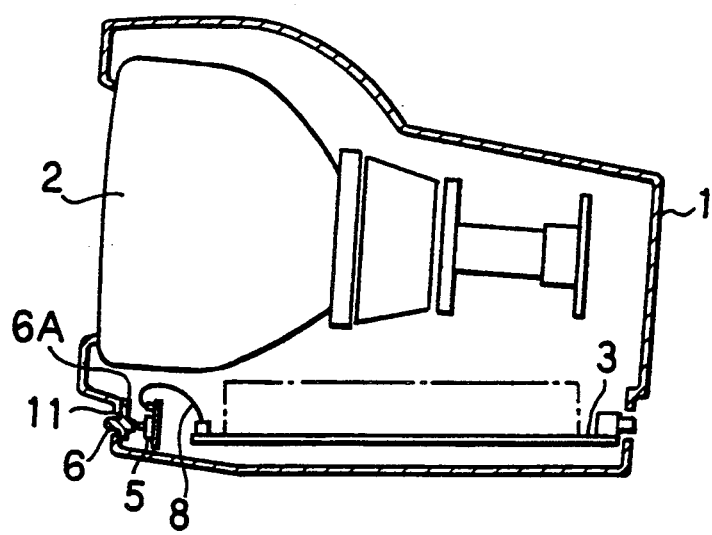
FIG. 1 is a sectional side view of a prior art cabinet assembly.
Figure 2:
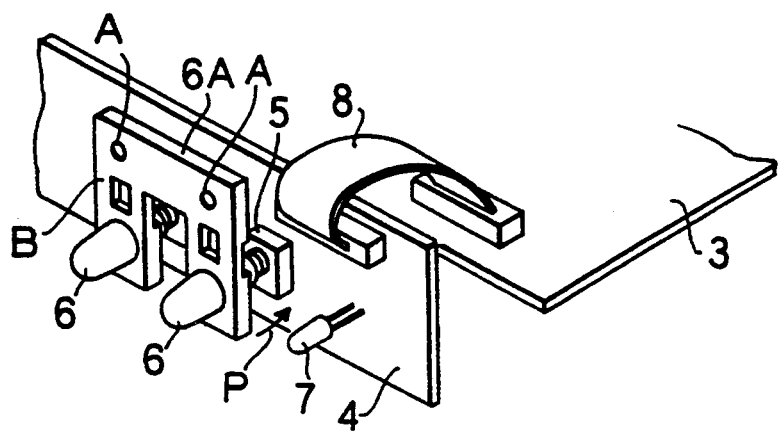
FIG. 2 is an enlarged perspective view of a portion of the cabinet assembly of FIG. 1 including keys and the associated parts.

Preferred embodiments of the present invention will now be described in detail with reference to the accompanying drawings, in which like component parts are designated by the same reference numerals throughout FIGS. 1 to 7, and the description of the component parts like or corresponding to those previously described with reference to FIG. 1 will be omitted to avoid duplication.

First Embodiment

Figure 3:
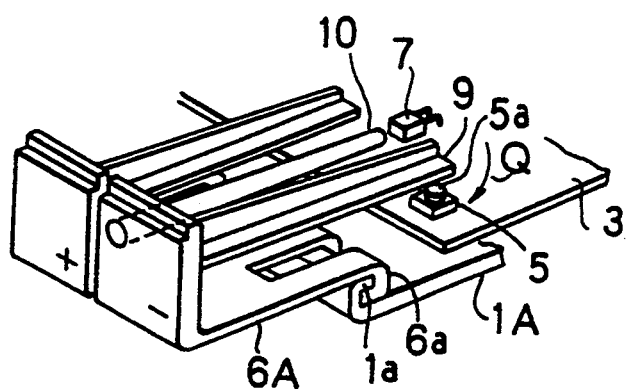
FIG. 3 is a perspective view of an essential portion of a cabinet assembly in a first embodiment according to the present invention.
Figure 4:
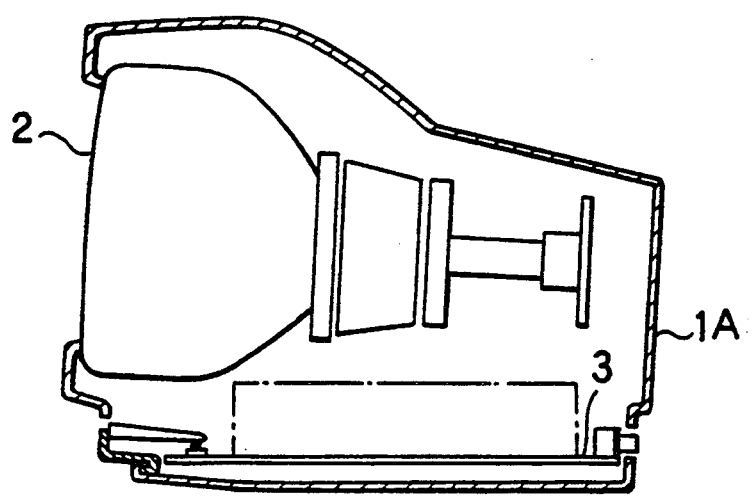
FIG. 4 is a schematic sectional view of the cabinet assembly in the first embodiment according to the present invention.

Referring to FIGS. 3 and 4, there are shown a cabinet 1A, a CRT 2 for displaying pictures, a main wiring board 3 provided with a control circuit and disposed in the bottom portion of the cabinet 1A, and switches 5 for adjusting the control circuit, mounted on the main wiring board 3 with their actuators 5a set in a vertical position.

A LED 7, i.e., a light emitting element, is mounted on the main wiring board 3 to indicate actions of the control circuit in response to the operation of the switch 5. The key tops of the substantially L-shaped keys 6A form portions of the external shape of the cabinet 1A. Each key 6A has an arm having a substantially U-shaped extremity end 6a engaging a substantially U-shaped edge 1a of the bottom wall of the cabinet 1A. An actuating rod 9 formed integrally with the key 6A depresses the actuator 5a of the switch 5 to close or open the switch 5 when the key 6A is pushed. A light guide 10, i.e., a light transmitting member, has one end joined to the key top of the key 6A and the other end positioned opposite to the LED 7 to transmit the light emitted by the LED 7 to the key top of the key 6A.

The key 6A is held firmly on the cabinet 1A by the engagement of the U-shaped end 6a of the arm thereof and the U-shaped edge 1a of the bottom wall of the cabinet 1A. When the key top of the key 6A is pushed, the arm of the key 6A is bent and the actuating rod 9 formed integrally with the key 6A is turned in the direction of the arrow Q, to operate the switch 5. The key top of the key 6A needs to be pushed only a short distance on the order of 0.5 mm to operate the switch 5. The bend of the arm of the key 6A is limited by a stopper, not shown.

When the switch 5 is thus operated, the control circuit is actuated by a signal applied thereto through the switch 5 and the LED 7 is turned on. The light emitted by the LED 7 is transmitted by the light guide 10 to the key top of the key 6A to illuminate the key top of the key 6A so that the completion of operation of the corresponding switch 5 and the completion of selection of a mode of operation specified by operating the key 6A can be confirmed.

Figure 5:
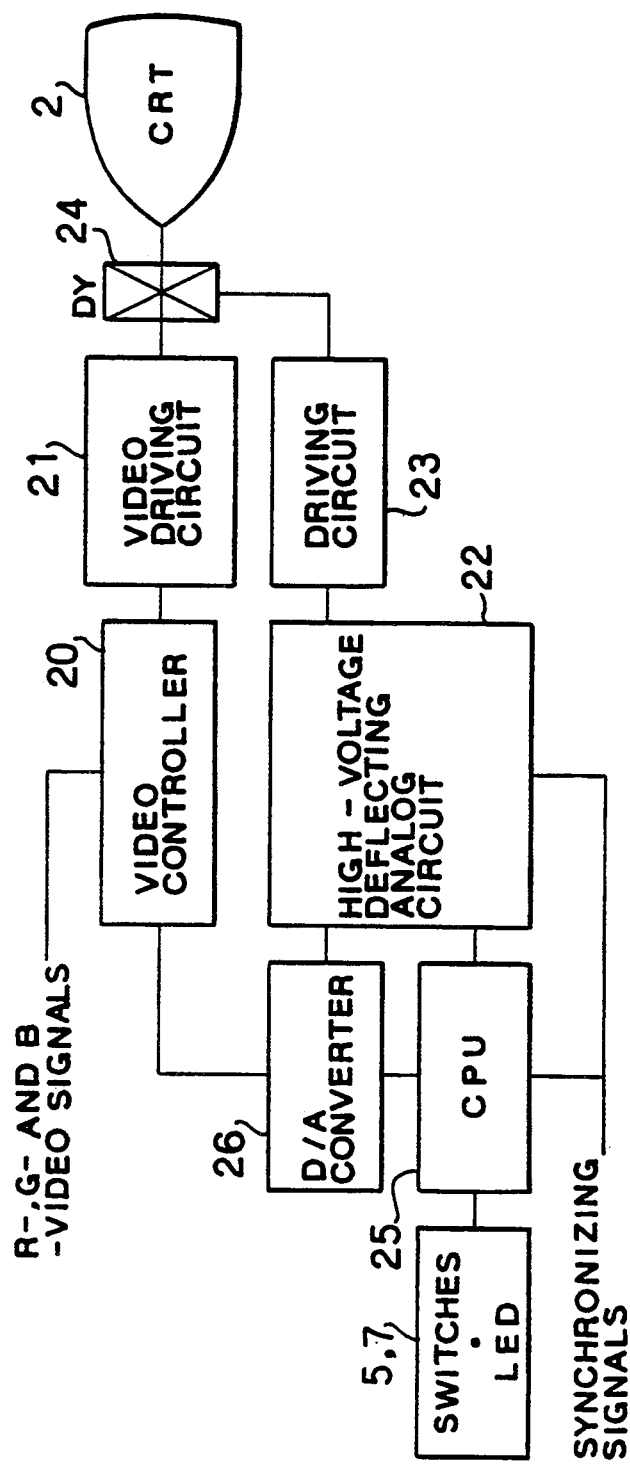
FIG. 5 is a block diagram of the cabinet assembly of FIG. 4 as applied to a monitor display.

Referring to FIG. 5 showing an circuit employed by the cabinet assembly as embodied in a monitor display, R-, G- and B-video signals provided by an external personal computer or the like are applied to a video controller 20. The video signals are transferred through a video driving circuit 21 to the CRT 2. Meanwhile, synchronizing signals are applied to a high-voltage deflecting analog circuit 22, and then a driving circuit 23 applies deflecting signals respectively corresponding to the R-, G- and B-video signals to the deflecting coil 24 of the CRT 2. Consequently, electron beams corresponding to the video signals, emitted by the video driving circuit 21 are deflected according to deflection signals provided by the driving circuit 23 to form pictures on the screen of the CRT 2.

The synchronizing signals are applied to a CPU 25 as well as to the high-voltage deflecting analog circuit 22 to control the video controller 20 and the high-voltage deflecting analog circuit 22 through a D/A converter 26 according to information set beforehand. The switch 5 is operated to adjust selectively the brightness of the screen of the CRT 2 or the contrast of the picture displayed on the CRT 2. When the key 6a is pushed, the switch 5 mounted on the main wiring board 3 is operated by the actuating rod 9 to apply a control signal to the CPU 25, and then the CPU 25 gives control signals through the D/A converter 26 to the video controller 20 and the high-voltage deflecting analog circuit 22 to adjust the brightness of the screen of the CRT 2 or the contrast of the picture displayed on the CRT 2. While the key 6A is pushed and the switch 5 is operated, the LED 7 remains lit. If the key 6A is pushed continuously, the brightness or the contrast will reach the maximum or the minimum of the brightness range or the contrast range. In such a case, the CPU 25 makes the LED 7 flicker.

Figure 6:
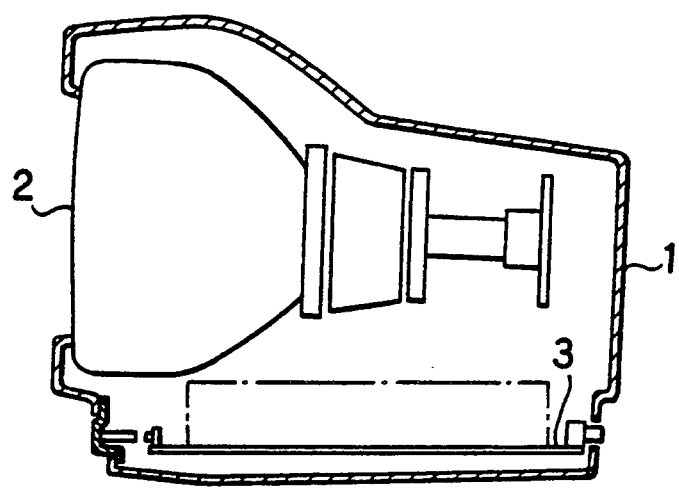
FIG. 6 is a sectional side view of a cabinet assembly in a second embodiment according to the present invention.
Figure 7:
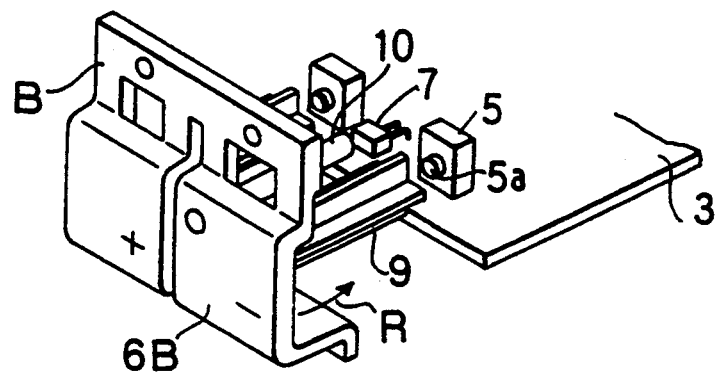
FIG. 7 is an enlarged perspective view of a portion of the cabinet assembly of FIG. 6 keys and the associated parts.

While in the cabinet assembly in the first embodiment, each switch 5 is mounted on the main wiring board 3 with its actuator 5a in a vertical position, and each key 6A is held so that the actuating rod 9 formed integrally with the key 6A is turned vertically downward to depress the actuator 5a when the key top of the key 6A is pushed horizontally, in a modification of the cabinet assembly as shown in FIGS. 6 and 7, the switches 5 may be mounted on the main wiring board 3 with their actuators 5a in a horizontal position, the upper ends of the key tops of keys 6B may be joined to a flexible plate B attached to the front wall of a cabinet 1, and the actuating rods 9 may be formed integrally with the keys 6B so as to extend horizontally. When the key top of each key 6B is pushed horizontally in the direction of the arrow R, the actuating rod 9 is displaced substantially horizontally to depress the actuator 5a of the corresponding switch 5. The cabinet assembly in this modification has the same advantages as those of the cabinet assembly in the first embodiment.

In another modification of the cabinet assembly in the first embodiment, the light guide 10 may be omitted and the LED 7 may be disposed near the U-shaped extremity end 6a of the arm of the key 6A to transmit the light emitted by the LED 7 through the arm of the key 6A to the key top of the same to illuminate the key top of the key 6A.

Second Embodiment

In a cabinet assembly in a second embodiment according to the present invention, a light guide 10 has one an end joined to a portion of a wall of a cabinet 1 corresponding to a key 5 and the other end disposed opposite to a LED 7, to transmit the light emitted by the LED 7 to the portion of the wall of the cabinet 1 so that the portion of the wall corresponding to the key 5 is illuminated when the key 5 is pushed.

As described above, the cabinet assembly in the first embodiment according to the present invention comprises: the cabinet; a main wiring board provided with a control circuit, disposed within the cabinet; switches for switching and adjusting the control circuit, mounted on the main wiring board; the light emitting element for indicating the actions of the control circuit, mounted on the main wiring board; and the keys held on the cabinet so as to be pushed and each of the keys having a key top forming a portion of the external shape of the cabinet; wherein each of the keys is provided integrally with an actuating rod to operate the corresponding switch when the respective key is pushed, and the light emitted by the light emitting element is transmitted by the light transmitting member to the respective key to illuminate the key top of the respective key.

Thus, the cabinet assembly need not be provided with any wiring board for supporting the switches and the light emitting element or any lead connector for connecting the switches and the light emitting element to the main wiring board, and the cabinet assembly is simple in construction can be easily assembled. Furthermore, the keys and the light emitting element for indicating the action of the control circuit do not place any restriction on the design of the cabinet.

The cabinet assembly in the second embodiment according to the present invention comprises: the cabinet; the main wiring board provided with the control circuit; the switches for switching and adjusting the control circuit, mounted on the main wiring board; the light emitting element for indicating the actions of the control circuit, mounted on the main wiring board; and the keys capable of being pushed from outside the cabinet and each of the keys having a key top forming a portion of the external shape of the cabinet; wherein each of the keys is provided integrally with the actuating rod to operate the corresponding switch when the respective key is pushed, and the light emitted by the light emitting element is transmitted by the light transmitting member to a portion of the cabinet to illuminate the portion of the cabinet.

Thus, the cabinet assembly in the second embodiment has an advantage that the action of the control circuit can be indicated on the portion of the cabinet, in addition to the advantages of the cabinet assembly in the first embodiment.

What is claimed is:

1. A cabinet assembly comprising:

a cabinet;
a main wiring board provided with a control circuit and disposed within the cabinet;
switches for switching and adjusting the control circuit, mounted on the main wiring board;
a light emitting element for indicating actions of the control circuit, mounted on the main wiring board; and
keys capable of being pushed from outside the cabinet and each of said keys having a key top forming a portion of the external shape of the cabinet and a working arm integrally formed with and substantially perpendicular to the key top;
wherein each of said keys is provided integrally with an actuating rod for operating the corresponding switch when the respective key is pushed by flexure of the working arm such that the direction of the pressure applied to the respective key is parallel to the direction of flexure of the working arm, and the light emitted by the light emitting element is transmitted by a light transmitting member directly to the key top of the respective key to illuminate the key top.

2. A cabinet assembly comprising:

a cabinet;
a main wiring board provided with a control circuit and disposed within the cabinet;
switches for switching and adjusting the control circuit, mounted on the main wiring board;
a light emitting element for indicating actions of the control circuit, mounted on the main wiring board; and
keys capable of being pushed from outside the cabinet and each of said keys having a key top forming a portion of the external shape of the cabinet and a working arm integrally formed with and substantially perpendicular to the key top;
wherein each of said keys is provided integrally with an actuating rod for operating the corresponding switch when the respective key is pushed by flexure of the working arm such that the direction of the pressure applied to the respective key is parallel to the direction of flexure of the working arm, and the light emitted by the light emitting element is transmitted by a light transmitting member directly to a portion of the cabinet to illuminate said portion of the cabinet.

* * * * *